(12) United States Patent
Carper et al.

(10) Patent No.: US 11,726,519 B2
(45) Date of Patent: Aug. 15, 2023

(54) CLOCKING SPRING FOR A ROTATABLE SHAFT

(71) Applicant: Raytheon Company, Waltham, MA (US)

(72) Inventors: Brent Carper, Tucson, AZ (US); Eric P. Huelsmann, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/555,025

(22) Filed: Dec. 17, 2021

(65) Prior Publication Data
US 2023/0195158 A1    Jun. 22, 2023

(51) Int. Cl.
*G05G 5/06*        (2006.01)

(52) U.S. Cl.
CPC ...................... *G05G 5/06* (2013.01)

(58) Field of Classification Search
CPC .. G05G 5/06; G05G 5/12; G05G 5/14; G05G 5/16; G05G 5/18; G05G 5/20; G05G 5/22; G05G 5/24; G05G 5/25; G05G 5/02; Y10T 74/20636; H01H 19/11; H01H 19/115; H01H 3/50; H01H 21/50; F16H 2061/243; F16H 2061/247
See application file for complete search history.

(56) References Cited

U.S. PATENT DOCUMENTS

| | | | |
|---|---|---|---|
| 1,785,709 A | 12/1930 | Campau | |
| 2,153,430 A * | 4/1939 | Newman | H01H 19/11 29/521 |
| 2,399,906 A * | 5/1946 | Bentley | H01H 19/11 200/6 B |
| 2,402,925 A | 6/1946 | Spooner | |
| 2,579,169 A | 12/1951 | Barry | |
| 4,043,437 A | 8/1977 | Taylor | |
| 4,789,287 A | 12/1988 | Le | |
| 4,945,195 A * | 7/1990 | Ipcinski | H01H 19/63 200/569 |
| 5,589,671 A * | 12/1996 | Hackbarth | H01H 19/115 200/11 R |
| 6,374,696 B1 | 4/2002 | Blake, III et al. | |

(Continued)

FOREIGN PATENT DOCUMENTS

CN    202970153 U    6/2013
CN    104100651 A    10/2014
(Continued)

OTHER PUBLICATIONS

Machine Translation of DE 10 2007 038 547.*
(Continued)

*Primary Examiner* — Richard W Ridley
*Assistant Examiner* — Brian J McGovern

(57) ABSTRACT

Described herein is a positioning spring configured to rotatably engage with a rotatable shaft. The rotatable shaft is configured to rotate relative to the positioning spring. The positioning spring comprises a first compliant lobe positioned at a first radial position. The first compliant lobe is configured to engage with one or more detent surfaces of the rotatable shaft to resist rotation of the rotatable shaft and to bias the rotatable shaft in one or more angular positions. The first compliant lobe is configured to flex upon engagement of the first compliant lobe with the rotatable shaft at a surface position out of contact with the detent surface.

33 Claims, 9 Drawing Sheets

(56) References Cited

U.S. PATENT DOCUMENTS

| | | | |
|---|---|---|---|
| 6,893,184 B2 | 5/2005 | Mills et al. | |
| 7,204,555 B2 | 4/2007 | Thiel | |
| 7,905,676 B2 | 3/2011 | Halder | |
| 2005/0084361 A1 | 4/2005 | Fly | |
| 2005/0139033 A1* | 6/2005 | Erdloff | G05G 5/06 |
| | | | 74/527 |
| 2008/0000762 A1* | 1/2008 | Kurihara | H01H 5/02 |
| | | | 200/329 |
| 2008/0190752 A1* | 8/2008 | Miyata | H01H 3/503 |
| | | | 200/565 |
| 2011/0126668 A1* | 6/2011 | Beraud | B60K 37/06 |
| | | | 74/813 R |
| 2011/0162176 A1 | 7/2011 | Tylaska et al. | |
| 2016/0209863 A1* | 7/2016 | Stringos | G05G 1/10 |
| 2018/0326873 A1 | 11/2018 | Nacy | |
| 2020/0040928 A1 | 2/2020 | Ganter | |

FOREIGN PATENT DOCUMENTS

| | | | |
|---|---|---|---|
| CN | 106571571 B | 12/2018 | |
| CN | 110733442 A | 1/2020 | |
| CN | 212297201 U | 1/2021 | |
| DE | 8910476 U1 | 10/1989 | |
| DE | 202005005057 | 11/2005 | |
| DE | 102007038547 A1 * | 2/2009 | ............ B60K 37/06 |
| DE | 202009009338 | 9/2009 | |
| DE | 102015110089 A1 | 12/2015 | |
| EP | 0227511 A1 | 7/1987 | |
| EP | 0838600 B1 | 2/2000 | |
| FR | 2903465 A1 | 1/2008 | |
| GB | 142877 | 5/1920 | |
| GB | 567474 | 2/1945 | |
| GB | 788011 | 12/1957 | |
| JP | 2000120202 A | 4/2000 | |
| WO | WO 2021/101681 A1 | 5/2021 | |

OTHER PUBLICATIONS

International Search Report for International Application No. PCT/US2022/046903 dated Jan. 24, 2023, 12 pages.

International Search Report for International Application No. PCT/US2022/046900 dated Feb. 9, 2023, 11 pages.

* cited by examiner

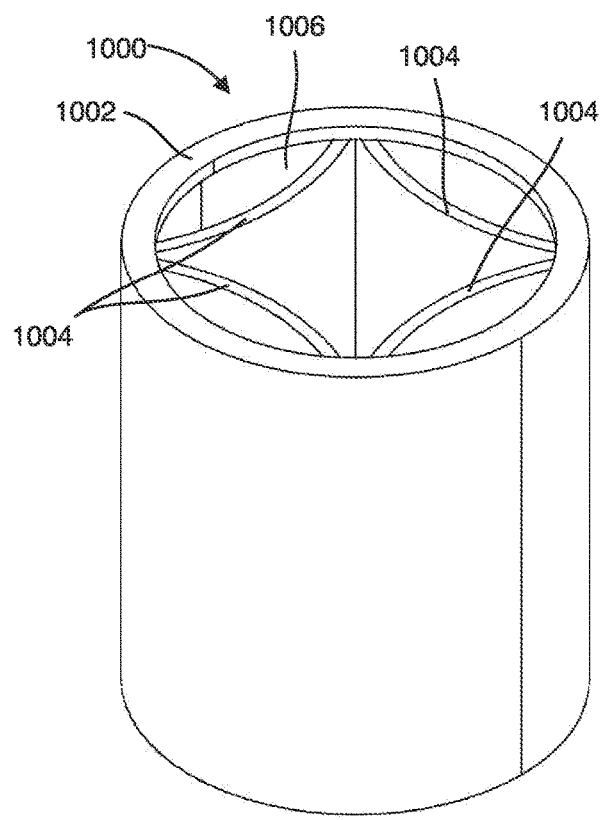
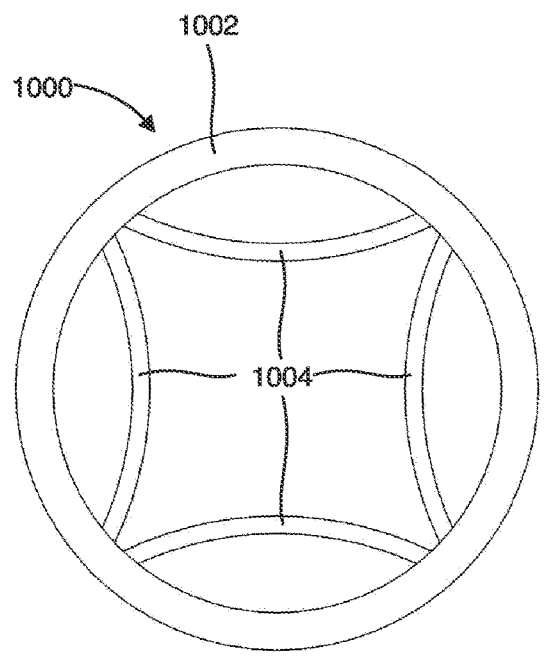
FIG. 10a  FIG. 10b
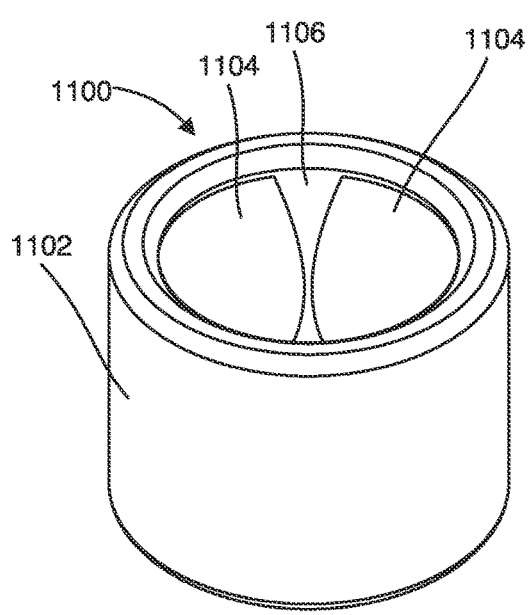
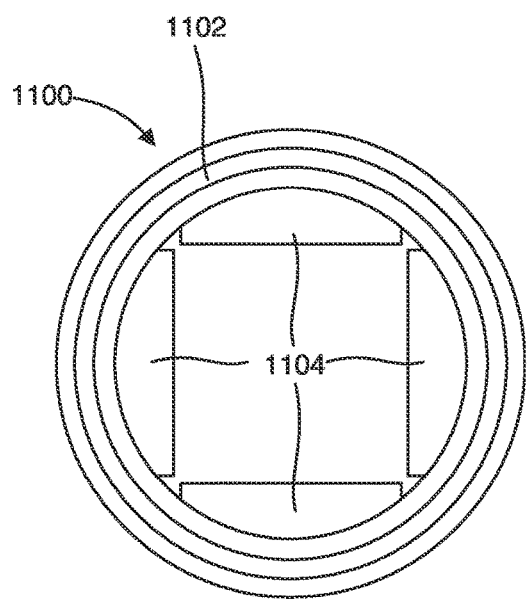
FIG. 11a  FIG. 11b

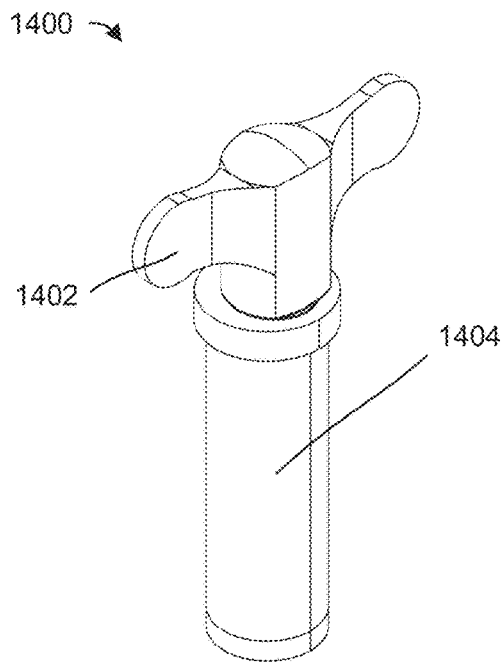
FIG. 14a
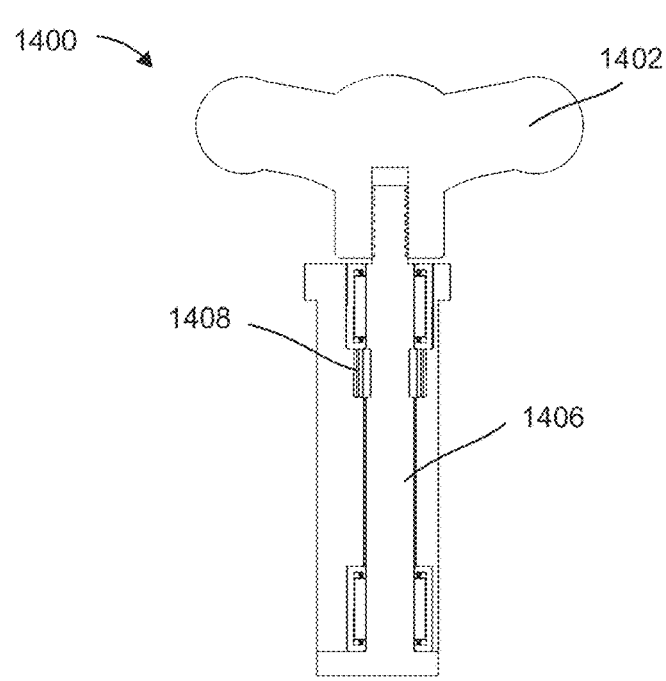
FIG. 14b
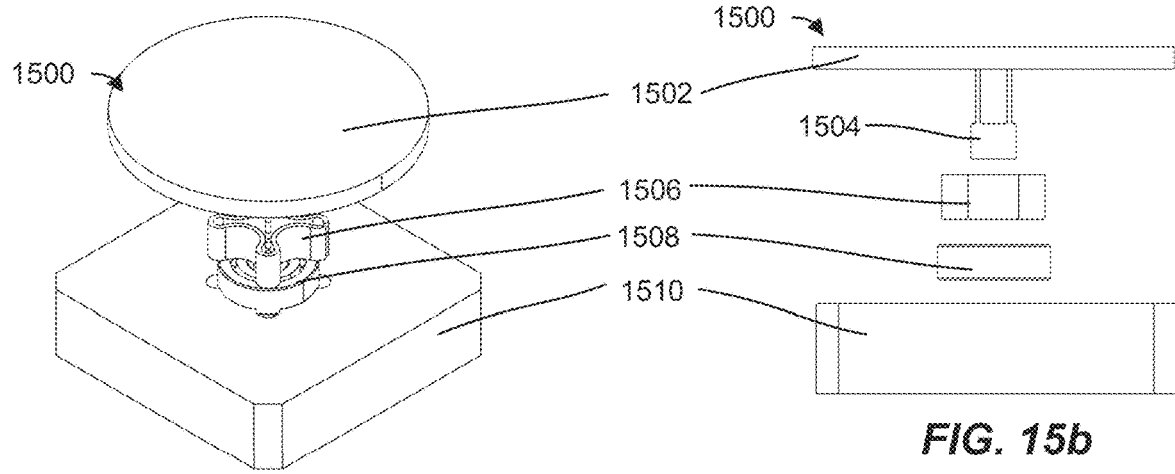
FIG. 15a
FIG. 15b
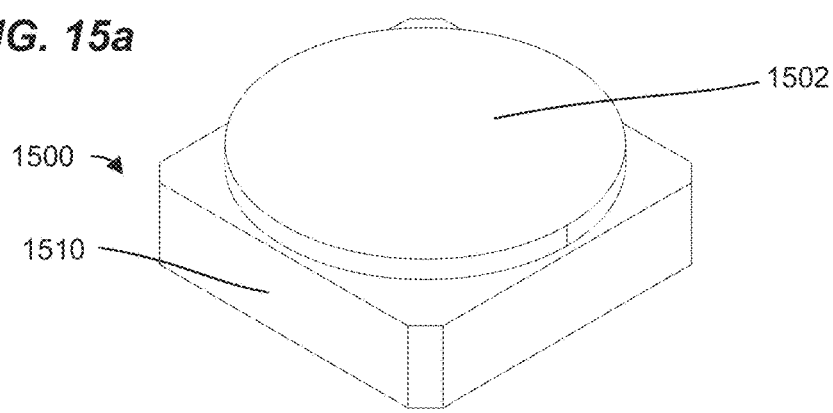
FIG. 15c

CLOCKING SPRING FOR A ROTATABLE SHAFT

BACKGROUND

Rotatable shafts are ubiquitous in modern machinery and manufacturing, such as those used in locking pins, turntables, drive shafts and others. In certain applications, precise angular positioning of rotatable shafts is desirable in order to properly lock and/or angularly position rotatable shafts at predetermined angular positions. Accordingly, various methods and devices have been developed to angularly position rotatable shafts and mechanisms attached to the rotatable shafts at desired angular positions. For example, spring-loaded slidable pins that engage with notches in rotatable mechanisms mounted on rotatable shafts have been developed for purposes of position tracking, angular locking, and stable positioning of rotatable shafts. However, current devices for locking rotatable shafts at desired positions involve large mechanisms with large footprints and multiple pieces that are not practical for use in small, confined, spaces where rotatable shafts are often used. Accordingly, development of simple and small-sized positioning springs and mechanisms for facilitating accurate angular positioning of rotatable shafts in confined spaces is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 10a and 10b, respectively, illustrate an isometric view and a top view of a positioning spring in accordance with an example of the present disclosure.

FIGS. 11a and 11b, respectively, illustrate an isometric view and a top view of a positioning spring in accordance with an example of the present disclosure.

FIGS. 14a and 14b illustrate isometric and cross-sectional side views, respectively, of an exemplary locking pin including a positioning system in accordance with an example of the present disclosure.

FIGS. 15a-15c illustrate exploded isometric, exploded side, and isometric views, respectively, of an exemplary turntable including a positioning system in accordance with an example of the present disclosure.

Figure 1A:
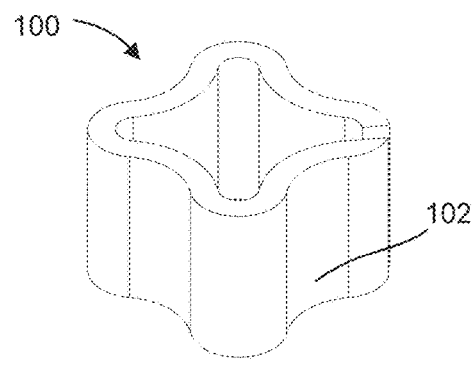
FIGS. 1a and 1b, respectively, illustrate an isometric view and a top view of a positioning spring in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Disclosed herein is a positioning spring configured to rotatably engage with a rotatable shaft that is configured to rotate relative to the positioning spring. The positioning spring can comprise a first compliant lobe positioned at a first radial or angular position as measured from a central axis. The first compliant lobe can be configured to engage with one or more detent surfaces of the rotatable shaft to resist rotation of the rotatable shaft and to bias the rotatable shaft in respective one or more radial or angular clocked positions. The first compliant lobe can be configured to flex (i.e., flex from a least or minimum flexed state with the compliant lobe engaged with the detent surface at a position with the rotatable shaft in a clocked angular position) upon rotation of the rotatable shaft out of the one or more clocked angular positions. Indeed, a force can be applied to the rotatable shaft to induce rotation of the rotatable shaft. The force can be sufficient to overcome the bias applied by the first compliant lobe, thus causing the first compliant lobe to flex depending upon the degree of rotation of the rotatable shaft. The first compliant lobe can flex a maximum amount upon engagement of the first compliant lobe with an outer surface of the rotatable shaft, or in other words, at a surface position on the rotatable shaft that is out of contact with the detent surface. Although the biasing and flexing functions just described are with respect to the first compliant lobe, these same functions are applicable to any of the compliant lobes described herein.

Disclosed herein is a positioning system for a rotatable shaft. The system can comprise a rotatable shaft having one or more detent surfaces formed thereon. The system can further comprise a positioning spring configured to rotatably engage with the rotatable shaft. The rotatable shaft can be configured to rotate relative to the positioning spring. The positioning spring can comprise a compliant lobe positioned at a first radial or angular position. The compliant lobe can be configured to engage with one or more detent surfaces of the rotatable shaft to resist rotation of the rotatable shaft and to bias the rotatable shaft in respective clocked angular positions. The first compliant lobe can be configured to flex, and can transition between a maximum flexed state and a minimum or least flexed state as the rotatable shaft rotates relative to the positioning spring to cause the compliant lobe to engage with at least one detent surface and an outer surface of the rotatable shaft. Indeed, as the rotatable shaft rotates relative to the positioning spring, the compliant lobe can be in contact with an outer surface of the rotatable shaft (where it will be in a maximum flexed state), further rotation of the rotatable shaft can cause the compliant lobe to come into contact with and engage a detent surface, and to slide along that detent surface (where the compliant lobe will begin to transition from the maximum flexed state towards a minimum or least flexed state). Further rotation of the rotatable shaft can cause the compliant lobe to enter the minimum or least flexed state upon the rotatable shaft being rotated to a clocked angular position. Still further rotation of the rotatable shaft relative to the positioning spring can cause the rotatable shaft to be out of the clocked angular position, and the compliant lobe to continue to slide along the detent surface until it again comes in contact with the outer surface of the rotatable shaft or another detent surface. As can be seen, as the rotatable shaft rotates, the positioning spring flexes and relaxes between the maximum and least or minimum flexed states depending upon the interaction engagement position of the compliant lobe with the rotatable shaft (or in other words depending upon the radial position and contact interface of the compliant lobe with the detent surfaces and outer surfaces of the rotatable shaft), It is noted that the compliant lobe can be configured to comprise a pre-load when in the least or minimum flexed state. The positioning spring can comprise a plurality of compliant lobes at different radial positions that can function in the same or similar way as the first compliant lobe.

Herein disclosed is a method of configuring a positioning spring configured to rotatably engage with a rotatable shaft that is configured to rotate relative to the positioning spring. The method can comprise configuring the positioning spring to comprise a first compliant lobe positioned at a first radial or angular position as measured from a central axis. The first compliant lobe can be configured to engage with one or more detent surfaces of the rotatable shaft to resist rotation of the rotatable shaft and to bias the rotatable shaft in respective clocked angular positions. The first compliant lobe can be configured to flex upon rotation of the rotatable shaft out of the one or more clocked angular positions. The method can further comprising configuring the positioning spring to comprise a plurality of compliant lobes at different angular or radial positions relative to the central axis of the positioning spring, each of which can function in the same or a similar manner as the first compliant lobe.

Figure 1B:
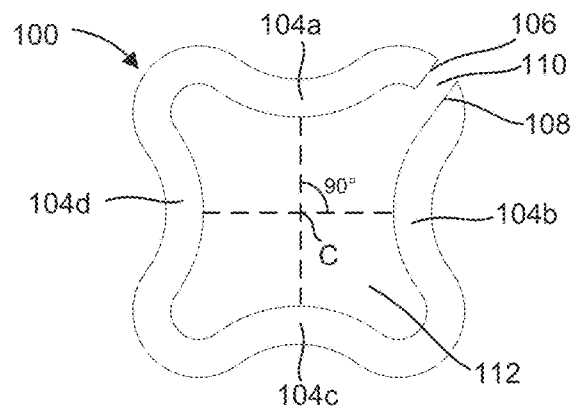

To further describe the present technology, examples are now provided with reference to the figures. With reference to FIGS. 1a and 1b, illustrated is a positioning spring 100 in accordance with an example of the present disclosure. FIG. 1a illustrates an isometric view of the positioning spring 100 comprising an elongate bendable member 102 having a desired width that is bent into a shape of the positioning spring 100. The elongate bendable member 102 can be made of any elongated piece of material suitable for making an elastic spring member as taught herein. The elongate bendable member 102 is shown to have a long and flat shape. However, this is not intended to be limited in any way, and any shape of elongated material can be used, such as cylindrical wire, flat strips of material, or others.

The positioning spring 100 can be made of any material that adds compliant properties to the positioning spring 100, such as spring steel, plastic, common 3D printing materials, or others. Compliant properties in the context of the positioning spring 100 means that the positioning spring 100 is sized, configured and made of a material, such that if a force acts upon the positioning spring 100 to flex the positioning spring away from its original shape, the positioning spring 100 will elastically return to its original shape (shown in FIGS. 1a and 1b) upon release of the force from the spring.

FIG. 1b illustrates a top view of the positioning spring 100. The positioning spring 100 can comprise a plurality of compliant lobes including a first compliant lobe 104a, a second compliant lobe 104b, a third compliant lobe 104c and a fourth compliant lobe 104d, each being configured to elastically deform (i.e., flex) under an applied load from a rotatable shaft operable with the positioning spring 100. The compliant lobes 104a, 104b, 104c, and 104d are each positioned at different radial or angular positions about or relative to a center C (i.e., central axis C extending into the page in the view shown in FIG. 1b) of the positioning spring 100. As shown, the compliant lobes 104a, 104b, 104c, and 104d of the positioning spring 100 are radially offset from each other by 90 degrees. Accordingly, the positioning spring 100 allows for a rotatable shaft to be disposed within and engaged with the positioning spring 100. In addition, the positioning spring 100 allows the rotatable shaft to be biased at four different clocked angular positions each spaced 90 degrees apart. A number of additional clocked angular positions of the rotatable shaft relative to the positioning spring 100 can be achievable in the event the rotatable shaft comprises a plurality of detent surfaces, for example, those that are radially positioned or spaced 45 degrees from one another as measured from a central axis of the rotatable shaft. As such, the number of angular clocked positions achievable by the rotatable shaft relative to the positioning spring 100 can be determined by the number and configuration of the compliant lobes on the positioning spring 100, the number and configuration of the detent surfaces on the rotatable shaft, or both. The positioning spring 100 can further define a central cavity 112 that is configured to receive at least a portion of a rotatable shaft therein.

A "clocked angular position," as discussed herein, refers to the position of the rotatable shaft with the positioning spring in its least or minimum flexed state (i.e., its most relaxed state) as interface and engaged with the rotatable shaft. With the rotatable shaft in a clocked angular position, the positioning spring resists rotation of the rotatable shaft and biases the rotatable shaft in this position. It is noted that with the rotatable shaft in the clocked angular position, the positioning spring can be under a pre-load as it is engaged with the rotatable shaft. The degree of pre-load can be equivalent to the least or minimum flexed state of the positioning spring as engaged with the rotatable shaft.

As illustrated in FIG. 1b, the elongate bendable member 102 can be bent into the identified shape to leave a first end 106 of the elongate bendable member 102 and a second end 108 of the elongate bendable member 102 disconnected from one another (i.e., open ends) with a gap 110 formed there between. The gap 110 can expand or contract under radial forces applied to the positioning spring 100 in order to facilitate flexure, expansion, and/or relaxing or retraction of the positioning spring 100 during rotation of a rotatable shaft positioned in the central cavity 112 of the positioning spring 100. As such, the positioning spring 100 can be configured, such that each of the compliant lobes 104a, 104b, 104c, and 104d can flex, the entire positioning spring 100 can flex (with the gap 110 widening), or some combination of these.

Figure 2A:
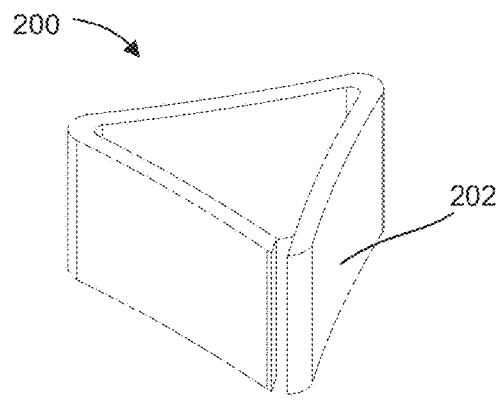
FIGS. 2a and 2b, respectively, illustrate an isometric view and a top view of a positioning spring in accordance with an example of the present disclosure.
Figure 2B:
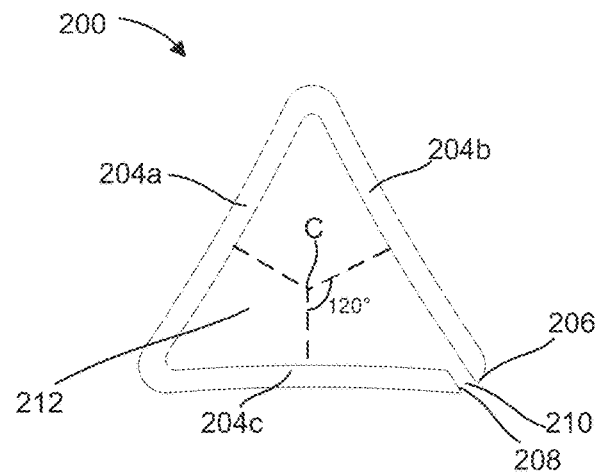

With reference to FIGS. 2a and 2b, illustrated is a positioning spring 200 in accordance with an example of the present disclosure. FIG. 2a illustrates an isometric view of the positioning spring 200 comprising an elongate bendable member 202 bent into a shape of the positioning spring 200. The elongate bendable member 202 can be made of any elongated piece of material suitable for making an elastic spring member as taught herein, similar to as described with respect to the positioning spring 100.

FIG. 2b illustrates a top view of the positioning spring 200. The positioning spring 200 can comprise a plurality of compliant lobes including a first compliant lobe 204a, a second compliant lobe 204b, and a third compliant lobe 204c, each being configured to elastically deform (i.e., flex) under an applied load from a rotatable shaft operable with the positioning spring 200. The compliant lobes 204a, 204b, and 204c are each positioned at different radial or angular positions about a center C (e.g., a central axis extending in and out of the page in the view shown) of the positioning spring 200. As shown the compliant lobes 204a, 204b, and 204c of the positioning spring 200 are offset from each other by 120 degrees. Accordingly, the positioning spring 200 allows for a rotatable shaft to be disposed within and engaged with the positioning spring 200. In addition, the positioning spring allows any given detent surface formed in the rotatable shaft to be biased at three different clocked angular positions each spaced 120 degrees apart. A number of clocked angular positions of the rotatable shaft relative to the positioning spring 200 can be achievable in the event the rotatable shaft comprises a plurality of detent surfaces, for example, those that are radially positioned or spaced 45 degrees from one another as measured from a central axis of the rotatable shaft. As such, the number of angular clocked positions achievable by the rotatable shaft relative to the positioning spring 200 can be determined both by the configuration of the positioning spring 200 and the configuration of the detent surfaces on the rotatable shaft. The positioning spring 200 can further define a central cavity 212 that is configured to receive at least a portion of a rotatable shaft therein.

As illustrated in FIG. 2b, the elongate bendable member 202 can be bent into the identified shape to leave a first end 206 of the elongate bendable member 202 and a second end 208 of the elongate bendable member disconnected or open with a gap 210 formed there between. The gap 210 can expand or contract under force applied to the positioning spring 200 to facilitate flexure and expansion of the positioning spring 200 during rotation of a rotatable shaft positioned in the central cavity 212 of the positioning spring 200. As such, the positioning spring 200 can be configured, such that each of the compliant lobes 204a, 204b, and 204c can flex, the entire positioning spring 100 can flex (with the gap 110 widening), or some combination of these.

Figure 3A:
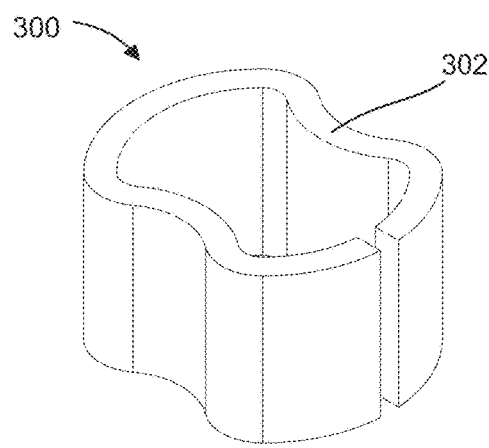
FIGS. 3a and 3b, respectively, illustrate an isometric view and a top view of a positioning spring in accordance with an example of the present disclosure.
Figure 3B:
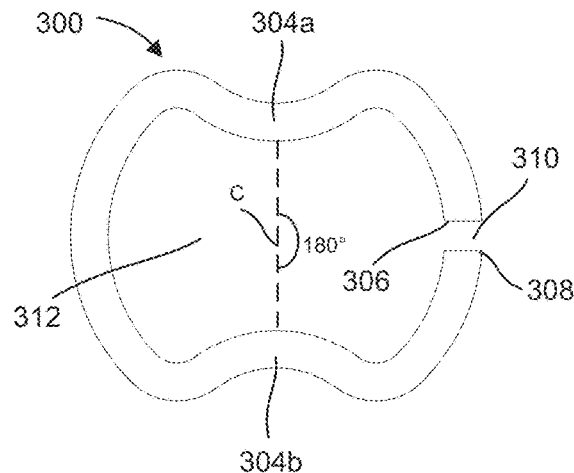

With reference to FIGS. 3a and 3b, illustrated is a positioning spring 300 in accordance with an example of the present disclosure. FIG. 3a illustrates an isometric view of the positioning spring 300 comprising an elongate bendable member 302 bent into a shape of positioning spring 300. The elongate bendable member 302 can be made of any elongated piece of material suitable for making an elastic spring member as taught herein, similar to as described with respect to the positioning spring 100 and the positioning spring 200.

FIG. 3b illustrates a top view of the positioning spring 300. The positioning spring 300 can comprise a plurality of compliant lobes including a first compliant lobe 304a and a second compliant lobe 304b, each being configured to elastically deform (i.e., flex) under an applied load from a rotatable shaft operable with the positioning spring 300. The compliant lobes 304a and 304b are each positioned at different radial or angular positions about a center C (i.e., central axis extending into the page, in the view shown) of the positioning spring 300. As shown, the compliant lobes 304a and 304b of the positioning spring 300 are offset from each other by 180 degrees. Accordingly, the positioning spring 300 allows for the rotatable shaft to be disposed within and engaged with the positioning spring 300. In addition, the positioning spring 300 allows any given detent surface formed in the rotatable shaft to be biased at two different clocked angular positions each spaced 180 degrees apart. A number of clocked angular positions of the rotatable shaft relative to the positioning spring 300 can be achievable in the event the rotatable shaft comprises a plurality of detent surfaces, for example, those that are radially positioned or spaced 45 degrees from one another as measured from a central axis of the rotatable shaft. As such, the number of angular clocked positions achievable by the rotatable shaft relative to the positioning spring 300 can be determined both by the configuration of the compliant lobes on the positioning spring 300 and the configuration of the detent surfaces on the rotatable shaft. The positioning spring 300 can further define a central cavity 312 that is configured to receive at least a portion of a rotatable shaft therein.

As illustrated in FIG. 3b, the elongate bendable member 302 can be bent into a shape to leave a first end 306 of the elongate bendable member 302 and a second end 308 of the elongate bendable member disconnected or open with a gap 310 formed there between. The gap 310 can expand or contract under force applied to the positioning spring 300 to facilitate flexure and expansion of the positioning spring 300 during rotation of a rotatable shaft positioned in the central cavity 312 of the positioning spring 300. As such, the positioning spring 300 can be configured, such that each of the compliant lobes 304a and 304b can flex, the entire positioning spring 100 can flex (with the gap 110 widening), or some combination of these.

Figure 4A:
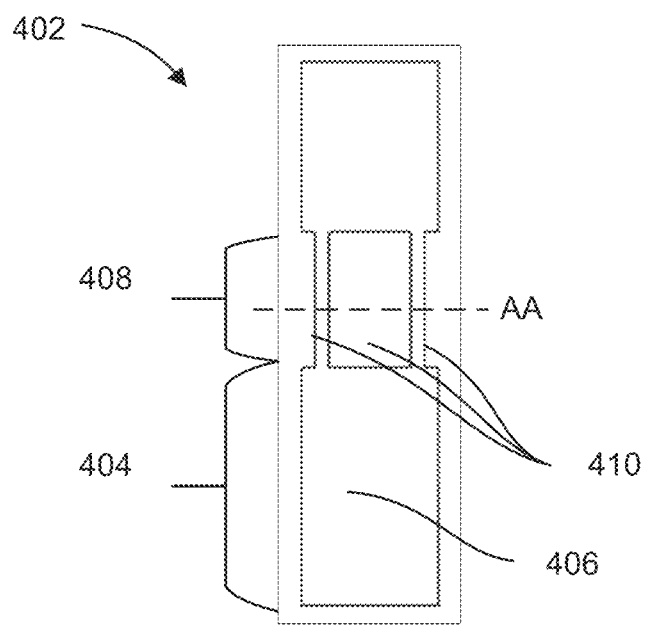
FIGS. 4a and 4b, respectively, illustrate a front view and a cross-sectional view of a rotatable shaft that can be disposed within a positioning spring in accordance with an example of the present disclosure.
Figure 4B:
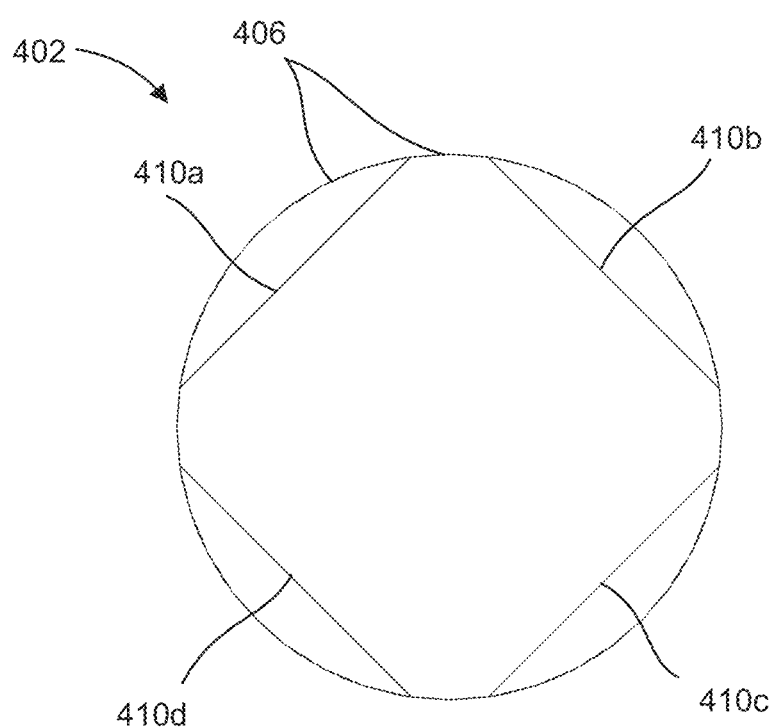

FIG. 4a illustrates a front view of a rotatable shaft 402 that can be used in conjunction with any of the positioning springs discussed herein, wherein the rotatable shaft is formed and configured in accordance with an example of the present disclosure. FIG. 4b illustrates a cross-section of the rotatable shaft 402 taken along line AA of FIG. 4a. As shown in FIGS. 4a-4b, the rotatable shaft 402 can comprise a cylindrical portion 404 having a substantially circular cross section and a cylindrical outer surface 406. Additionally, the rotatable shaft 402 can comprise a detent portion 408 comprising one or more detent surfaces. In this example, the rotatable shaft 402 comprises four detent surfaces, namely first detent surface 410a, second detent surface 410b, third detent surface 410c and fourth detent surface 410d. The detent surfaces 410a, 410b, 410c and 410d can be substantially flat surfaces formed in the otherwise cylindrical rotatable shaft 402. However, this is not intended to be limited in any way. The detent surfaces can be formed as pockets, indents, protrusions, or any other suitable shape for receiving and engaging one or more portions of a positioning spring. The detent portion 408 and the detent surfaces 410a, 410b, 410c and 410d can be configured to comprise a height greater than a height of the positioning spring intended to be operable with the rotatable shaft.

Figure 5:
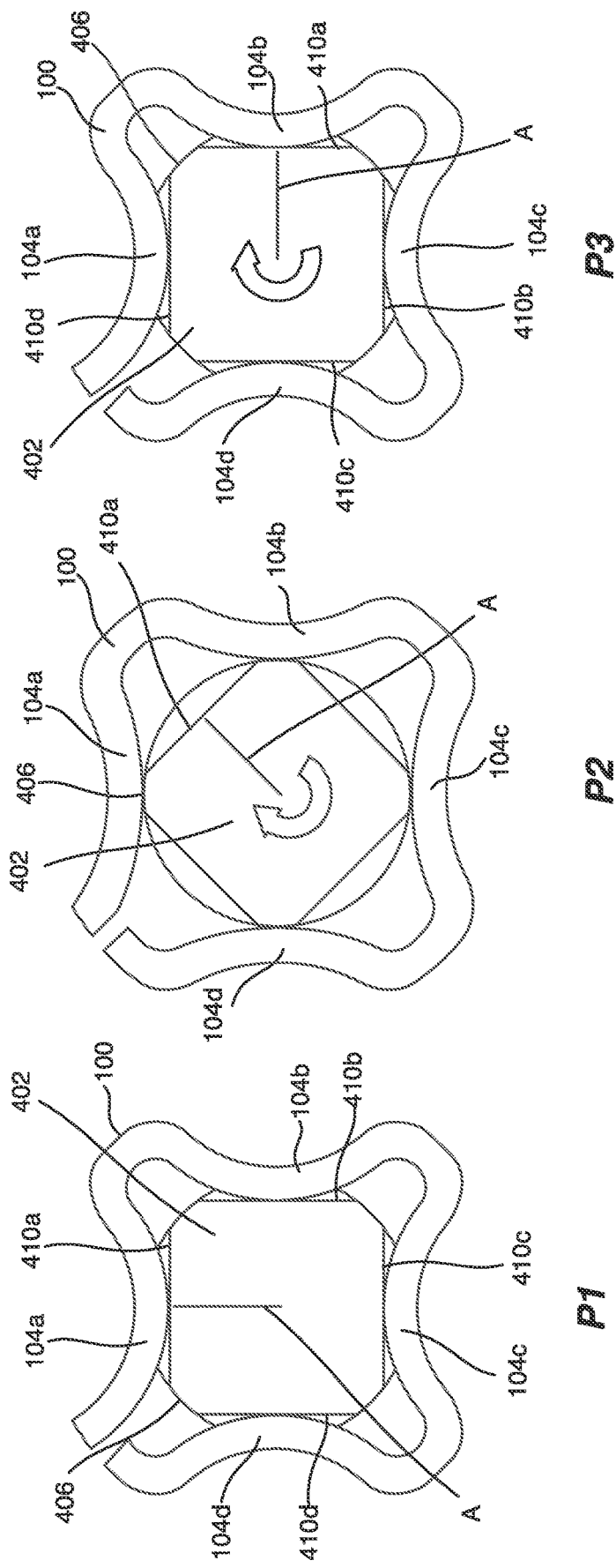
FIG. 5 illustrates the rotatable shaft of FIG. 4b at various angular positions within the positioning spring of FIGS. 1a and 1b.

The function of the positioning springs described herein is explained with reference to FIG. 5 using the positioning spring 100 of FIGS. 1a and 1b and the rotatable shaft 402 of FIGS. 4a and 4b as examples. FIG. 5 illustrates the rotatable shaft 402 in a sequence of angular positions that are reached during rotation of the rotatable shaft 402 in accordance with an example of the present disclosure. The positioning spring 100, as illustrated in FIG. 5, can be disposed to surround and rotatably engage the detent portion 408 of the rotatable shaft 402, such that the rotatable shaft 402 and the positioning spring 100 are rotatable relative to each other. The positioning spring 100 can be compliant and can comprise one or more compliant lobes (e.g., see compliant lobes 104a, 104b, 104c, and 104d) configured to engage with detent surfaces 410a, 410b, 410c and 410d depending upon the rotation of the rotatable shaft 402 relative to the positioning spring 100. In other words, the detent surfaces 410a, 410b, 410c and 410d can be configured to receive and engage any one of the compliant lobes 104a, 104b, 104c, and 104d of the positioning spring 100.

Three angular positions P1, P2, and P3 are shown in FIG. 5 to illustrate rotation of the rotatable shaft 402 within the positioning spring 100, wherein the rotatable shaft 402 rotates relative to the positioning spring 100. In angular position P1, indicator line A (used for clarity purposes to indicate the position of detent surface 410a) indicates that the rotatable shaft 402 is oriented with respect to the positioning spring 100, such that the compliant lobe 104a is engaged with the detent surface 410a. As shown, the distance or radius from a center of the rotatable shaft 402 to a midpoint of each of the detent surfaces 410a, 410b, 410c and 410d is less than a distance or radius from the center of the rotatable shaft 402 to any point on the detent surfaces 410a, 410b, 410c, and 410d away from the midpoint, as well as less than a distance or radius from the center of the rotatable shaft 401 to a point on the cylindrical outer surface 406 of the rotatable shaft 502. In the position P1, the compliance of the positioning spring 100 causes a force to be exerted on the detent surfaces 410a, 410b, 410c and 410d by the compliant lobes 104a, 104b, 104c, and 104d. By engagement of the compliant lobes 104a, 104b, 104c, and 104d with the detent surfaces 410a, 410b, 410c and 410d, rotation of the rotatable shaft 402 is resisted by the positioning spring 100 and the rotatable shaft 402 is biased by the positioning spring 100 to be held in the first clocked angular position P1 in which indicator line A is shown as being directed upward in FIG. 5. In this docked angular position (and in any docked angular position), the compliant lobes 104a, 104b, 104c, and 104d are in a minimal or least flexed state. Moreover, compliant lobes 104a, 104b, 104c, and 104d can be configured (e.g., curved in this example) such that they provide what is essentially a line contact with detent surfaces 410a, 410b, 410c and 410d, such that rotation of rotatable shaft 802 causes compliant lobes 104a, 104b, 104c, and 104d to slide along detent surfaces 410a, 410b, 410c and 410d, where they are caused to flex outwardly to accommodate such rotation of rotatable shaft 402.

When sufficient torque or rotational force is applied to induce rotation in the rotatable shaft 402 within positioning spring 100 and to overcome the biases applied by the compliant lobes 104a, 104b, 104c, and 104d, the compliant lobes 104a, 104b, 104c, and 104d are caused to slide along the detent surfaces 410a, 410b, 410c, and 410d, respectively, and to flex (e.g., outward) to accommodate the increase in distance of the center of the rotatable shaft to the point of interface of the compliant lobes 104a, 104b, 104c, and 104d on the rotatable shaft 402. This distance is at its maximum when the compliant lobes are out of contact with the detent surfaces, and instead in contact with the outer surface 406 of the rotatable shaft 402 (e.g., see angular position P2 (which is not a clocked angular position)). As such, it follows that this distance is at its minimum when the compliant lobes are in contact with the detent surfaces at a midpoint of the detent surfaces (e.g., see clocked angular position P1), as stated above. In the intermediate position P2, the compliant lobes 104a, 104b, 104c, and 104d are at a maximum flexed state as they are out of contact with the detent surfaces 410a, 410b, 410c and 410d, and instead, in contact with the cylindrical outer surface 406 of the rotatable shaft 402.

Clocked angular position P3 illustrates when rotation of the rotatable shaft 402 has been such that the compliant lobes 104a, 104b, 104c, and 104d of the positioning spring 100 spring back to their original pre-flexed position (i.e., their least or minimum flexed state) to engage and clamp against detent surfaces 410a, 410b, 410c and 410d. The detent surface 410a receives and is engaged with the compliant lobe 104b, the detent surface 410b receives and is engaged with the compliant lobe 104c, the detent surface 410c receives and is engaged with the compliant lobe 104d, and the detent surface 410d receives and is engaged with the compliant lobe 104a, In other words, the compliant lobe 104b engages with the detent surface 410a. By this engagement between the compliant lobes and the detent surfaces, the rotatable shaft 402 is held in a new clocked angular position P3 where the detent surface 410a is engaged with the compliant lobe 104b. The compliance of the positioning spring 100 holds the compliant lobes 104a, 104b, 104c, and 104d against respective detent surfaces to resist rotation of the rotatable shaft 402 and to bias the rotatable shaft 402 to the clocked angular position P3.

Figure 6:
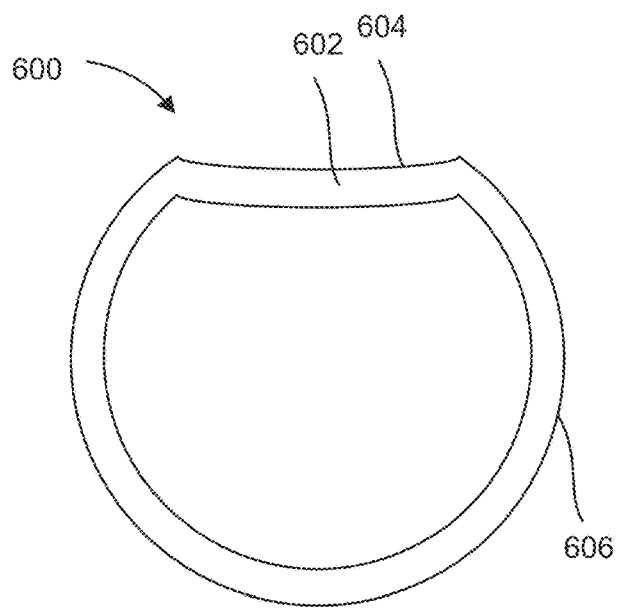
FIG. 6 illustrates a top view of a single lobe positioning spring in accordance with an example of the present disclosure.

The positioning spring 100 and the rotatable shaft 402 shown allows for the rotatable shaft 402 to be biased at four different clocked angular positions, each spaced 90-degrees apart. However, this is not intended to be limited in any way. As taught herein, a positioning spring can have any number of compliant lobes to engage with any number of detent surfaces of a rotatable shaft. For example, FIG. 6 illustrates a top view of a positioning spring 600 in accordance with an example of the present disclosure. The positioning spring 600 comprises a single compliant lobe 602 disposed at a lobe portion 604 of the positioning spring 600. The remaining portion 606 of positioning spring 600 can be circular in cross-sectional shape. However, this is not intended to be limited in any way.

The positioning springs discussed herein, can be used with multiple different rotatable shafts of different configuration, such as those having a different number of detent surfaces. The number of detent surfaces can be determined based on a desired number of clocked angular positions in which to bias the rotatable shaft. As discussed, the number and positioning of the detent surfaces on a given rotatable shaft can determine the number and spacing of clocked angular positions of the rotatable shaft. In one aspect, the number of detent surfaces on a given rotatable shaft can be the sole determinant of the number of available clocked angular positions of the given rotatable shaft (e.g., a positioning spring having only one detent surface operable with a rotatable shaft having multiple detent surfaces). In another aspect, both the configuration of a rotatable shaft and the configuration of a positioning spring operable with a given rotatable shaft can determine the number of available docked angular positions of the given rotatable shaft (e.g., a rotatable shaft having a plurality of detent surfaces operable with a positioning spring having a plurality of detent surfaces), It is noted that this concept of configuring a positioning spring, or configuring a rotatable shaft, or configuring both of these, to achieve a desired number of docked angular positions of the rotatable shaft relative to the positioning spring will be apparent to those skilled in the art.

Figure 7A:
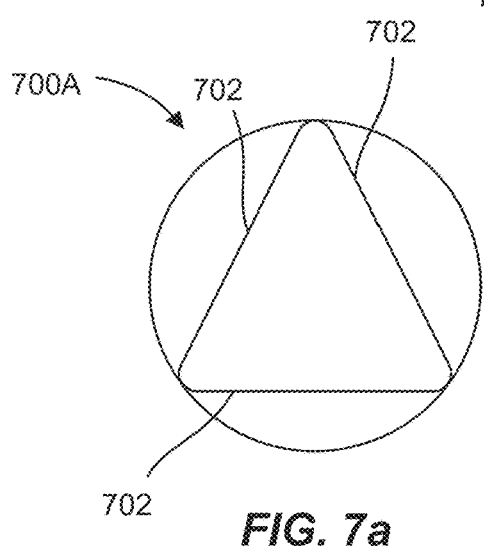
FIGS. 7a-7d illustrate cross sectional views of various rotatable shafts in accordance with examples of the present disclosure.
Figure 7B:
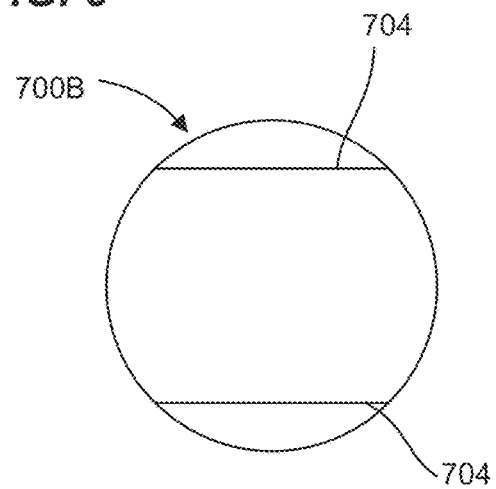
Figure 7C:
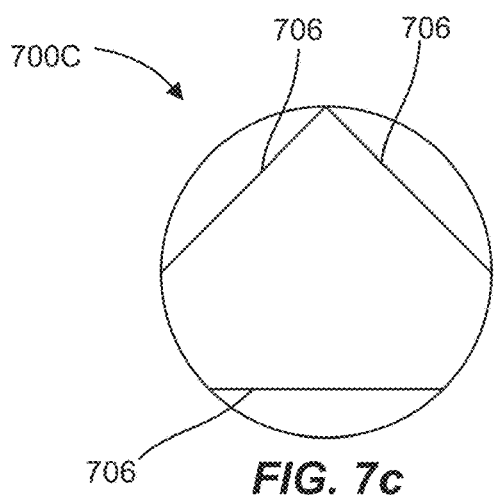
Figure 7D:
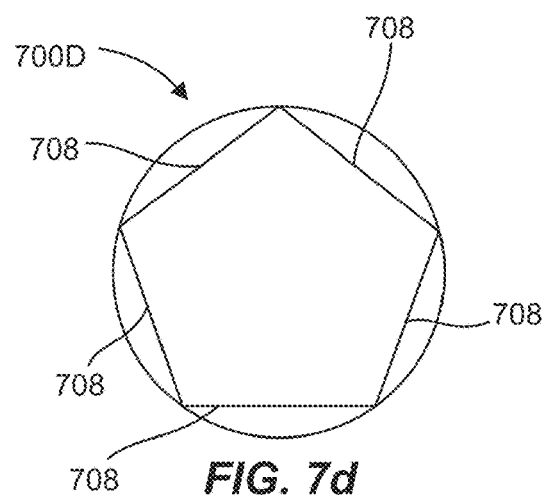

With reference to FIGS. 7a, 7b, 7c, and 7d, illustrated are various rotatable shafts in accordance with different examples of the present disclosure. FIG. 7a illustrates a rotatable shaft 700A having three detent surfaces 702 disposed in a substantially triangular shape at 120 degrees apart. FIG. 7b illustrates a rotatable shaft 7008 having two detent surfaces 704 disposed 180 degrees apart. FIG. 7c illustrates a rotatable shaft 700C having three detent surfaces 706 where one or more of the detent surfaces 706 are unevenly spaced from one or more of the other of the detent surfaces 706. FIG. 7d illustrates a rotatable shaft 700D having five detent surfaces 702 disposed in a substantially pentagonal shape. Many other configurations are possible, though not explicitly illustrated. The number of detent surfaces on a rotatable shaft is not intended to be limited in any way. A rotatable shaft can be designed to have any number of detent surface spaced at even radial positions, uneven radial positions, or any combination thereof.

It will be understood that depending on the angular spacing of the compliant lobes on the positioning springs and the detent surfaces on the rotatable shafts, a particular positioning spring can be configured to engage with multiple different rotatable shafts and a particular rotatable shaft can be used with multiple different positioning springs. For example, both the positioning spring 200 of FIG. 2b and the positioning spring 600 of FIG. 6 can be used with rotatable shaft 700A, in which both configurations result in rotatable shaft having three docked angular positions of the rotatable shaft 700A spaced about 120 degrees apart. Additionally, the positioning spring 300 can be used with both the rotatable shaft 402 of FIG. 4b (resulting in clocked angular positions of the rotatable shaft 402 being 90 degrees apart) and the rotatable shaft 700B of FIG. 7b (resulting in clocked angular positions of the rotatable shaft 700B being 180 degrees apart). The positioning spring 600 can be used with any rotatable shaft described herein. Single compliant lobe 602 is configured to engage with each detent surface of a rotatable shaft in sequence as the rotatable shaft is rotated with respect to the positioning spring 600, such that the clocked angular positions of a rotatable shaft engaged with positioning spring 600 will match the positioning of detent surfaces on the rotatable shaft.

Again, those of skill in the art will appreciate that the positioning spring and rotatable shaft can be designed in conjunction with each other to result in any desired configuration of clocked angular positions in which to bias a rotatable shaft. Indeed, a given positioning spring can have a number of compliant lobes equal to a number of detent surfaces on a corresponding rotatable shaft or the given positioning spring can have a number of compliant lobes different than a number of detent surfaces on a corresponding rotatable shaft. Additionally, the compliant lobes and detent surfaces can be spaced at any radial position around the positioning springs and rotatable shafts, respectively. The detent surfaces of the rotatable shaft can be radially offset from one another at equal or unequal radial angles or degrees, and the compliant lobes of the positioning springs can be radially offset from one another at equal or unequal radial angles or degrees.

Figure 8A:
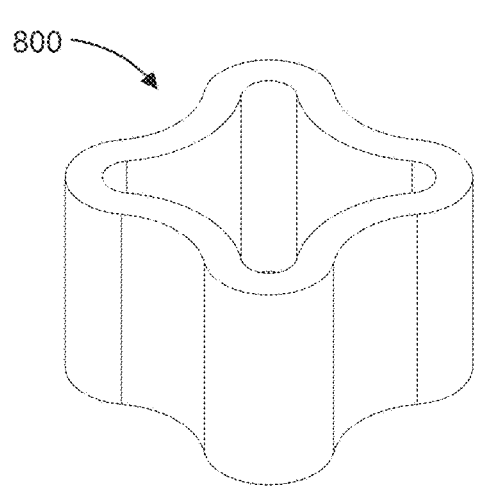
FIGS. 8a and 8b, respectively, illustrate an isometric view and a top view of a positioning spring in accordance with an example of the present disclosure.
Figure 8B:
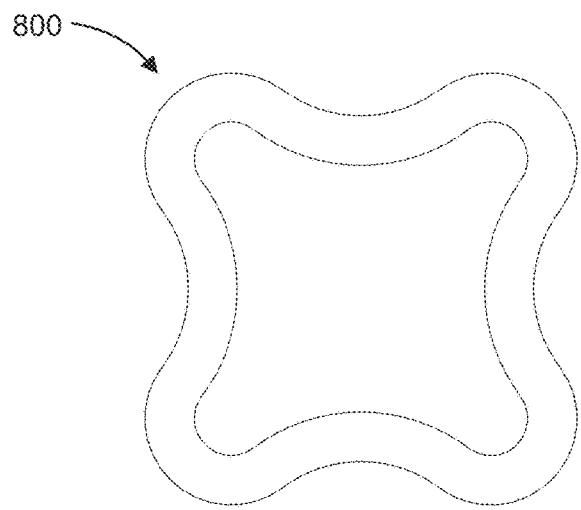
Figure 9A:
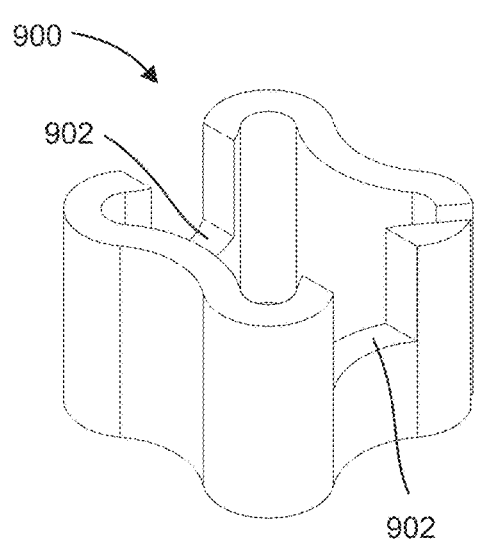
FIGS. 9a and 9b, respectively, illustrate an isometric view and a top view of a positioning spring in accordance with an example of the present disclosure.
Figure 9B:
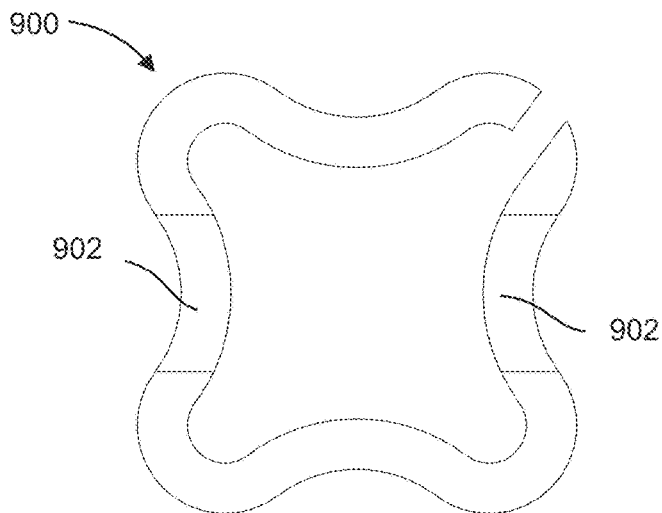

Modifications can be made to any of the examples described herein. For example, the positioning springs 100, 200, and 300 are shown to be non-continuous with the ends not connected and defining gaps 110, 210, and 310 formed in at least one part of the positioning springs. The positioning springs 100, 200, and 300 can be bent from a single elongate piece of material into a desired shape. However, continuous examples are also possible. For example, a continuous or dosed positioning spring 800 is shown in FIGS. 8a and 8b in accordance with an example of the present disclosure. Any of the positioning springs described herein can be made either continuous (i.e., no open ends and no gap) or non-continuous (i.e., first and second ends are not connected and define a gap there between). Continuous positioning spring examples can be machined from a single piece of material or they can be made by bending one or more elongate pieces of material and joining the ends via a manufacturing process, such as welding, or via an adhesive, to form a continuous positioning spring. Additionally, as shown in the positioning spring 900 of FIGS. 9a and 9b, relief cuts or relief gaps 902 can be formed in the compliant lobes to facilitate flexure of the positioning spring under less of a load than with a similar positioning spring without such relief cuts or gaps 902.

Additional examples of positioning springs are described with reference to FIGS. 10a-11b, which are configured in accordance with examples of the present disclosure. While the positioning springs described previously comprise a single part design or configuration, FIGS. 10a and 10b illustrate multi-part positioning spring assemblies. Positioning spring 1000 illustrated in FIGS. 10a and 10b can include a tubular outer housing or collar 1002 and one or more flexures 1004 retained by an inner surface 1006 of the tubular outer housing 1002. Each of the one or more flexures 004 provide and define a compliant lobe similar to those described in examples above. The flexures 1004 can be retained in the tubular outer housing 1002 applying a load to flex the flexures 1004, which flexures 1004 can then be inserted into the tubular outer housing 1002 and caused to partially expand once in position within the tubular outer housing 1002 to a flexed position where the flexures are maintained in a desired position within the tubular outer housing 1002. The flexures can be maintained in a desired position within the tubular outer housing 1002 a number of different ways. In one example, the flexures 1004 can be fit into slots formed in the inner surface of the tubular outer housing 1002. In another example, the flexures 1004 can be adhered, welded, or otherwise fixed in the tubular outer housing 1002. The manner of fixing flexures within the tubular outer housing is not intended to be limited in any way.

FIGS. 11a-11b illustrate a positioning spring 1100 in accordance with an example of the present disclosure. The positioning spring 1110 can include tubular outer housing or collar 1102 with an inner surface 1106. Flexures 1104 can be retained within tubular outer housing 1102.

In the positioning spring 1000 of FIGS. 10a and 10b, the flexures 1004 are oriented, from a first end in contact with tubular outer housing to a second end in contact with tubular outer housing 1002, in a direction perpendicular to a longitudinal axis of the tubular outer housing 1002. In the positioning spring 1100 of FIGS. 11a and 11b, the flexures 1104 are oriented, from a first end in contact with tubular outer housing 1102 to a second end in contact with tubular outer housing 1102, in a direction parallel to a longitudinal axis of the tubular outer housing 1102. Positioning springs similar to 1000 and 1100 can have any number of compliant lobes/flexures and can be manufactured in configurations similar to any of the other positioning springs described herein. Additionally, the flexures 1004 and 1104 interface with detent surfaces of rotatable shafts in a manner similar to or the same as described herein with regard to other examples.

A positioning system can include any of the positioning springs described herein (e.g., see positioning springs 100, 200, 300, 600, 800, 900, 1000, 1100, 1202, 1204, 1212, 1214, 1222, 1224) and any of the rotatable shafts described herein (e.g., see rotatable shafts 402, 700A, 700B, 7000, 700D, 1206, 1216, 1226), the rotatable shaft having one or more detent surfaces for receiving a compliant lobe of an interfaced positioning spring. Additionally, a positioning system as described herein can include a plurality of positioning springs operable with a rotatable shaft having a plurality of detent portions, each detent portion comprising one or more detent surfaces.

Figures 12A, 12B, 12C:
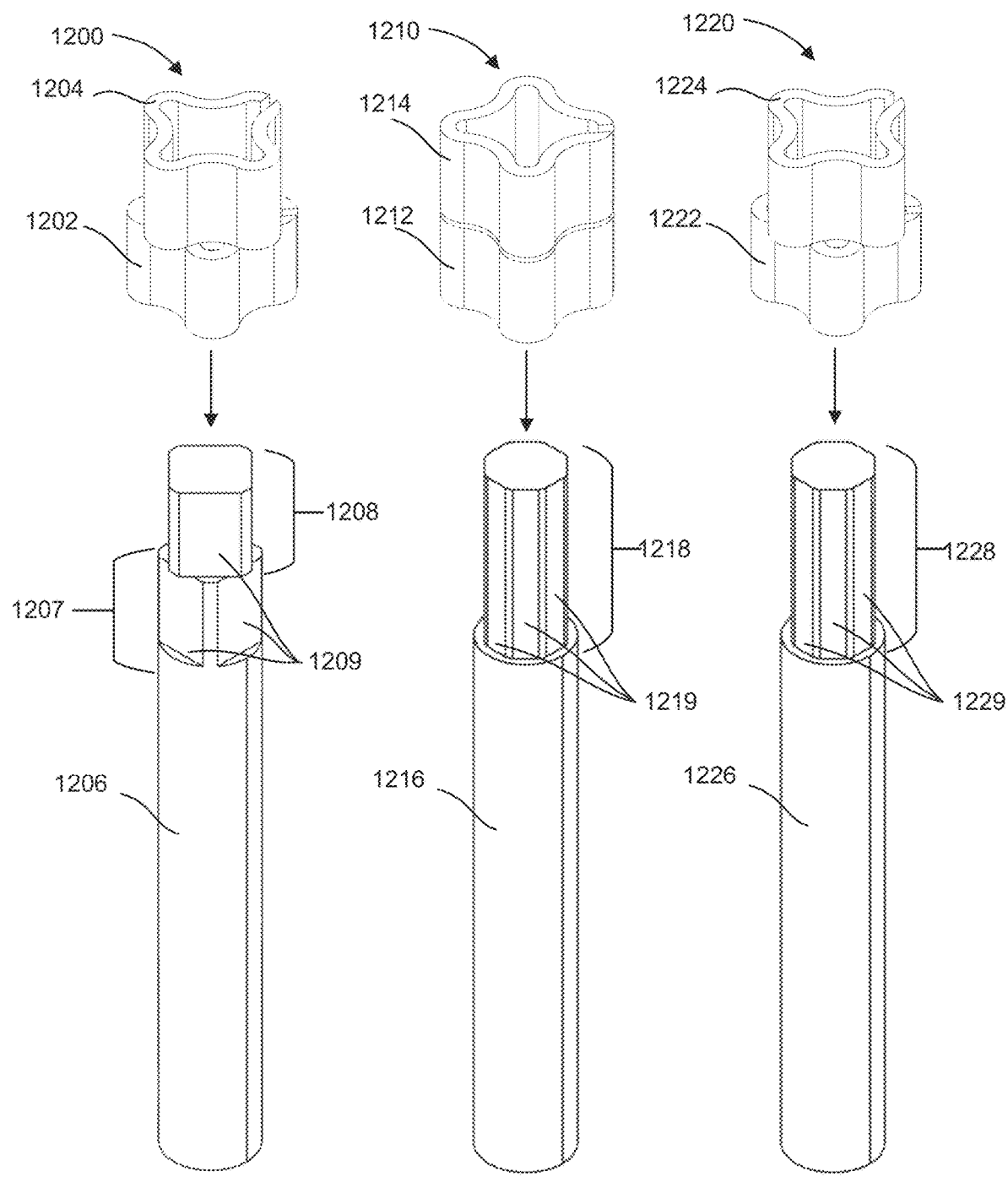
FIGS. 12a-12c illustrate various exploded views of exemplary positioning systems, each including a rotatable shaft and at least one positioning spring, in accordance with examples of the present disclosure.

FIGS. 12a-12c illustrate positioning systems 1200, 1210, and 1220, respectively, in accordance with examples of the present disclosure. The positioning systems 1200, 1210, and 1220 can include multiple positioning springs arranged so as to be axially spaced apart from one another (e.g., adjacent one another, or stacked) on a single rotatable shaft. FIG. 12a illustrates the positioning system 1200, which can include a first positioning spring 1202 and a second positioning spring 1204 configured to rotatably engage with rotatable shaft 1206, each of the first and second positioning springs 1202, 1204 being configured as the positioning spring 100 in FIGS. 1a and 1b. The rotatable shaft 1206 can include a first detent portion 1207 configured to receive the first positioning spring 1202, and a second detent portion 1208 axially spaced from the first detent portion 1207 (e.g., adjacent one another), and configured to receive the second positioning spring 1204. Each of the first and second detent portions 1207 and 1208 can include one or more detent surfaces 1209 configured to receive and engage with compliant lobes of corresponding positioning springs 1202 and 1204 (or any others as taught herein). The detent surfaces of the first detent portion 1207 can be radially or angularly offset from (i.e., out of radial alignment with) the detent surfaces of the second detent portion 1208 relative to a central axis of the rotatable shaft 1206. In the positioning system 1200, compliant lobes of second positioning spring 1204 are radially or angularly offset from or out of alignment with compliant lobes of first positioning spring 1202 (relative to a common central axis of positioning springs 1202 and 1204), such that first positioning spring 1202 and second positioning spring 1204 are axially offset from one another on rotatable shaft 1206 and the positioning springs 1201 and 1204 are radially or angularly offset or out of alignment with each other relative to the common central axis of positioning springs 1202 and 1204.

FIG. 12b illustrates the positioning system 1210 including a first positioning spring 1212 and a second positioning spring 1214 configured to engage with a rotatable shaft 1216, each of the first and second positioning springs 1212, 1214 being configured as the positioning spring 100 in FIGS. 1a and 1b. The rotatable shaft 1216 can include an elongated detent portion 1218 configured to receive the first positioning spring 1212 and the second positioning spring 1214 (i.e., the detent portion 1218 comprising a height at least as high as the first and second positioning springs 1214, 1216 stacked on top of one another). The detent portion 1218 can include a plurality of detent surfaces 1219 configured to receive the compliant lobes of the corresponding positioning springs 1212 and 1214. In the positioning system 1210, the compliant lobes of the second positioning spring 1214 and the first positioning spring 1212 are in substantial alignment with each other such that, when the first positioning spring 1202 and the second positioning spring 1204 are stacked on the rotatable shaft 1206, the positioning springs 1212 and 1214 and the compliant lobes thereof are substantially aligned with each other.

Using multiple positioning springs can allow for a positioning system to be configured with different spring forces acting on a rotatable shaft. Using two identical springs can create double spring forces on the rotatable shaft. Therefore, the rotatable shaft may be more firmly biased to a clocked radial or angular position and may require more force to rotate within the positioning springs. Additionally, positioning springs can be made of different materials, having different spring constants, degrees of compliance, and can have different dimensions and thicknesses. These differences can be used to create different levels of desired spring forces on a rotatable shaft. While positioning systems 1200, 1210, and 1220 use multiple identical positioning springs, it will be apparent to those skilled in the art that the positioning springs can be different from each other and have the same or a different number of compliant lobes. Axial spaced detent portions (each having one or more detent surfaces) on the rotatable shaft can be adjacent one another (i.e., stacked), and they can also be formed to have the same or different numbers of detent surfaces in order to radially locate the various clocked angular positions of the rotatable shaft at desired angles and intervals. Moreover, multiple detent portions (each having one or more detent surfaces) on a single rotatable shaft do not have to be adjacent one another. Indeed, the multiple detent portions on the rotatable shaft can be located at spaced apart axial positions along the rotatable shaft, with each being configured to receive and engage a positioning spring.

It is noted that the positioning system can comprise multiple detent portions on a rotatable shaft, with a single positioning spring operable with any one or both of the multiple detent portions. In this example, a first detent portion can comprise a different number and/or location of detent surfaces than that of a second detent portion, with the single positioning spring being operable with either of the first or second detent portions to achieve different clocked angular positions of the rotatable shaft.

FIG. 12c illustrates positioning system 1220 that can include a first and a second positioning spring 1222 and 1224 and a rotatable shaft 1226 including detent portion 1228, each of the first and second positioning springs 1222, 1224 being configured as the positioning spring 100 in FIGS. 1a and 1b. As shown, the positioning springs 1222 and 1224 can be out of alignment with each other such that each of the compliant lobes of the positioning spring 1222 are positioned at a radial position between the radial positions of two adjacent compliant lobes of the positioning spring 1224.

Figure 13A:
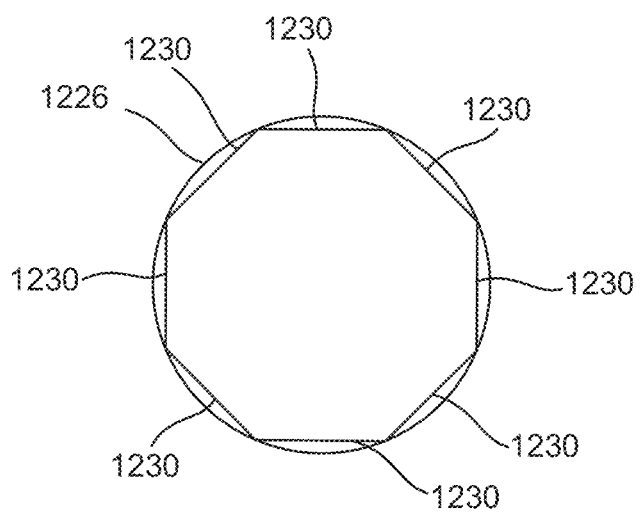
FIG. 13a illustrates a cross-sectional view of the rotatable shaft of FIGS. 12b and 12c.
Figure 13B:
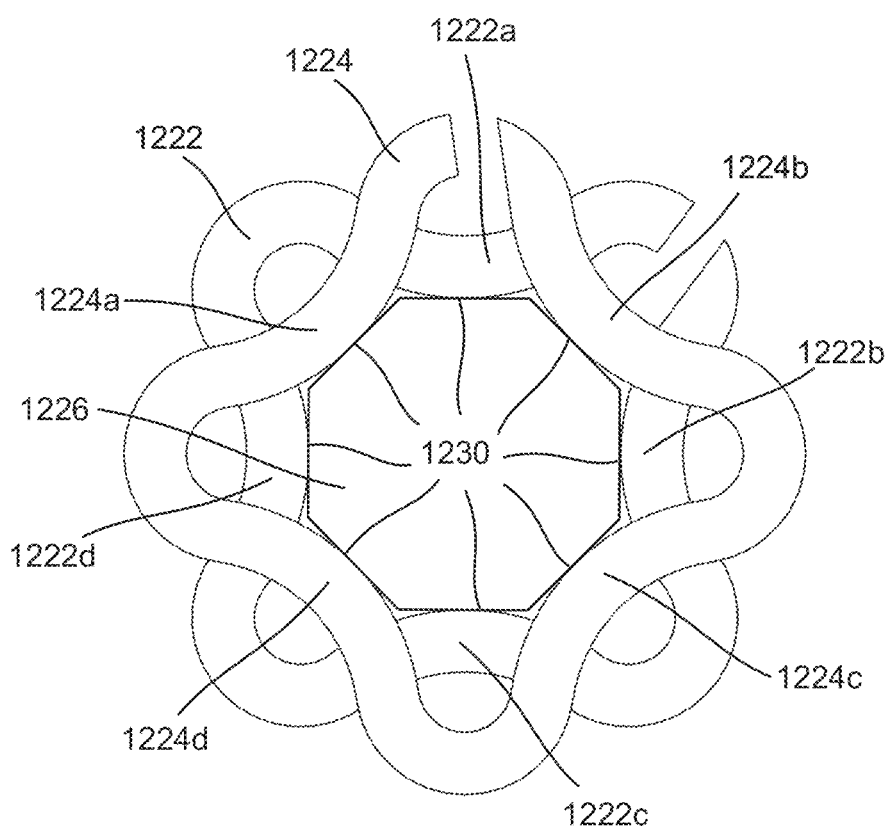
FIG. 13b illustrates a cross-sectional view of the rotatable shaft with positioning springs of FIGS. 12b and 12c engaged with the rotatable shaft.

FIG. 13a illustrates a cross-sectional view of rotatable shaft 1226 taken through detent portion 1228 of FIG. 12c. As shown, the rotatable shaft 1226 can include eight detent surfaces 1230. FIG. 13b illustrates the first and the second positioning springs 1222 and 1224 engaged with the detent surfaces 1230 of the rotatable shaft 1226. As shown, the compliant lobes 1222a, 1222b, 1222c, and 1222d of the first positioning spring 1222 and the compliant lobes 1224a, 1224b, 1224c, and 1224d of second positioning spring 1224 can engage with every detent surface 1230 of the plurality of detent surfaces of the rotatable shaft 1226 depending upon the rotation of the rotatable shaft 1226 relative to the first and second positioning springs 1222 and 1224. According to this configuration, the rotatable shaft 1226 has eight clocked angular positions spaced equally from each other. As shown, using multiple positioning springs having four compliant lobes each can result in a configuration of eight clocked angular positions of the rotatable shaft 1226.

The positioning systems described herein can be used in multiple different applications. For example, FIGS. 14a and 14b illustrate an exemplary retaining pin 1400 that incorporates a positioning system in accordance with an example of the present disclosure. Retaining pin 1400 can comprise a handle 1402 and an outer housing 1404. The handle 1402 can rotate the rotatable shaft 1406 disposed within the housing 1404. The rotatable shaft 1406 can be a rotatable shaft according to an example of the present disclosure. The rotatable shaft 1406 can be engaged with a positioning spring 1408 as described herein to provide clocked angular positions of the rotatable shaft 1406 and the locking pin 1400.

In another example, a turntable can utilize the positioning systems as described herein. FIGS. 15a-15c illustrate a turntable 1500 that can include a table 1502 including a rotatable shaft 1504 that engages with positioning spring 1506. The rotatable shaft 1504 and the positioning spring 1506 can be any configuration of rotatable shaft and/or positioning spring described herein, or as recognized by those skilled in the art within the spirit of the present disclosure. The rotatable shaft 1504 can rotatably engage with roller bearing 1508 and base 1510 to form a complete turntable 1500 with multiple clocked angular positions of the rotatable shaft 1504 and the table 1502 as defined by the interface of the rotatable shaft 1504 with the positioning spring 1506, as taught herein, Of course, these example applications are not intended to be limiting in any way. Indeed, those skilled in the art will recognize a variety of different applications into which one or more of the positioning systems described herein can be implemented.

A method of configuring a positioning spring configured to rotatably engage with a rotatable shaft operable to rotate relative to the positioning spring can comprise configuring the positioning spring to comprise one or more compliant lobes positioned at respective radial positions. The one or more compliant lobes can be configured to engage with one or more detent surfaces of the rotatable shaft to resist rotation of the rotatable shaft and to bias the rotatable shaft in one or more clocked angular positions. The one or more compliant lobes can be configured to flex upon rotation of the rotatable shaft out of the one or more clocked angular positions. The configuring of the positioning springs in the method can comprise configuring any of the positioning springs as discussed herein (e.g., see positioning springs 100, 200, 300, 600, 800, 900, 1000, 1100, 1202, 1204, 1212, 1214, 1222, 1224), or any others apparent to those skilled in the art in the spirit of the present disclosure. In addition, the rotatable shaft operable with the positioning spring can be configured as any of the rotatable shafts discussed herein (e.g., see rotatable shafts 402, 700A, 700B, 7000, 700D, 1206, 1216, 1226), or any others apparent to those skilled in the art in the spirit of the present disclosure.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein can be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics can be combined in any suitable manner in one or more examples. In the preceding description, numerous specific details were provided, such as examples of various configurations to provide a thorough understanding of examples of the described technology. It will be recognized, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims.

Numerous modifications and alternative arrangements can be devised without departing from the spirit and scope of the described technology.

What is claimed is:

1. A positioning spring configured to rotatably engage with a rotatable shaft that is configured to rotate relative to the positioning spring, the positioning spring comprising:
   a first axially distal surface defining a perimeter of the positioning spring;
   a first compliant lobe positioned at a first radial position along the perimeter;
   a relief gap formed into the first compliant lobe, the relief gap extending from the first axially distal surface along an axial axis of the positioning spring;
   wherein the first compliant lobe is configured to engage with one or more detent surfaces of the rotatable shaft to resist rotation of the rotatable shaft and to bias the rotatable shaft in one or more clocked angular positions; and wherein the first compliant lobe is configured to flex upon rotation of the rotatable shaft out of the one or more clocked angular positions.

2. The positioning spring of claim 1, further comprising a second compliant lobe radially offset from the first compliant lobe at a second radial position,
wherein the second compliant lobe is configured to engage with the one or more detent surfaces of the rotatable shaft to resist rotation of the rotatable shaft and to bias the rotatable shaft in the one or more clocked angular positions, and
wherein the second compliant lobe is configured to flex upon rotation of the rotatable shaft out of the one or more clocked angular positions.

3. The positioning spring of claim 2, further comprising a third compliant lobe radially offset from the first and second compliant lobes at a third radial position,
wherein the third compliant lobe is configured to engage with the one or more detent surfaces of the rotatable shaft to resist rotation of the rotatable shaft and to bias the rotatable shaft in the one or more clocked angular positions, and
wherein the third compliant lobe is configured to flex upon rotation of the rotatable shaft out of the one or more clocked angular positions.

4. The positioning spring of claim 3, wherein the first, second, and third compliant lobes are radially offset from each other at equal radial degrees.

5. The positioning spring of claim 3, wherein one or more of the first, second, or third compliant lobes are radially offset from each other at unequal radial positions around the perimeter.

6. The positioning spring of claim 3, further comprising a fourth compliant lobe radially offset from the first, second, and third compliant lobes at a fourth radial position,
wherein the fourth compliant lobe is configured to engage with the one or more detent surfaces of the rotatable shaft to resist rotation of the rotatable shaft and to bias the rotatable shaft in the one or more clocked angular positions, and
wherein the fourth compliant lobe is configured to flex upon rotation of the rotatable shaft out of the one or more clocked angular positions.

7. The positioning spring of claim 1, wherein the positioning spring is formed by an elongate bendable member.

8. The positioning spring of claim 7, wherein the elongate bendable member is continuous.

9. The positioning spring of claim 7, wherein the elongate bendable member is non-continuous, and comprises first and second ends disconnected from one another, and defining a gap there between.

10. The positioning spring of claim 1, further comprising:
a tubular outer housing;
a first flexure retained by an inner surface of the tubular outer housing, the first flexure defining the first compliant lobe.

11. The positioning spring of claim 10, further comprising a second flexure retained by the inner surface of the tubular outer housing;
wherein the second flexure defines a second compliant lobe radially offset from the first compliant lobe at a second radial position, the second compliant lobe being configured to engage with the one or more detent surfaces of the rotatable shaft to resist rotation of the rotatable shaft and to bias the rotatable shaft in the one or more clocked angular positions, and wherein the second compliant lobe is configured to flex upon engagement of the second compliant lobe with the rotatable shaft at a surface position out of contact with the detent surface.

12. A positioning system, comprising:
a rotatable shaft having a detent portion comprising one or more detent surfaces;
a positioning spring configured to rotatably engage with the rotatable shaft operable to rotate relative to the positioning spring, the positioning spring comprising:
a first axially distal surface defining a perimeter of the positioning spring;
one or more compliant lobes positioned at respective radial positions;
a relief gap formed into the one or more compliant lobes, the relief gap extending from the first axially distal surface along an axial axis of the positioning spring;
wherein the one or more compliant lobes are configured to engage with the one or more detent surfaces of the detent portion of the rotatable shaft to resist rotation of the rotatable shaft and to bias the rotatable shaft in one or more clocked angular positions, and
wherein the one or more compliant lobes are configured to flex upon rotation of the rotatable shaft out of the one or more clocked angular positions.

13. The positioning system of claim 12, wherein the rotatable shaft comprises a different number of detent surfaces than a number of the compliant lobes of the positioning spring.

14. The positioning system of claim 12, wherein the one or more compliant lobes are under a pre-load as engaged with the one or more detent surfaces at the one or more clocked angular positions.

15. The positioning system of claim 12, wherein the rotatable shaft comprises a second detent portion comprising one or more detent surfaces, and wherein the positioning spring comprises a first positioning spring, the positioning system further comprising a second positioning spring comprising one or more compliant lobes,
wherein the one or more compliant lobes of the second positioning spring are configured to engage with the one or more detent surfaces of the second detent portion of the rotatable shaft to resist rotation of the rotatable shaft and to bias the rotatable shaft in the one or more clocked angular positions, and
wherein the one or more compliant lobes of the second positioning spring are configured to flex upon rotation of the rotatable shaft out of the one or more clocked angular positions.

16. The positioning system of claim 15, wherein the first positioning spring and the second positioning spring have a same number of compliant lobes.

17. The positioning system of claim 15, wherein the first positioning spring and the second positioning spring have a different number of compliant lobes.

18. The positioning system of claim 15, wherein the first positioning spring and the second positioning spring are axially offset from one another on the rotatable shaft, and wherein the one or more compliant lobes of the first positioning spring are radially out of alignment with the one or more compliant lobes of the second positioning spring.

19. The positioning system of claim 15, wherein the first positioning spring and the second positioning spring are axially offset from one another on the rotatable shaft, and wherein the one or more compliant lobes of the first positioning spring are radially aligned with the one or more compliant lobes of the second positioning spring.

20. The positioning system of claim 12, wherein the one or more detent surfaces of the detent portion of the rotatable shaft are located at a first axial position, and wherein the rotatable shaft comprises a second detent portion comprising one or more detent surfaces located at a second axial position, the positioning spring being operable with at least one of the first or second detent portions.

21. The positioning system of claim 20, wherein the one or more detent surfaces of the detent portion at the first axial position are radially offset from the one or more detent surfaces of the second detent portion at the second axial position.

22. The positioning system of claim 12, wherein the positioning spring comprises a first compliant lobe positioned at a first radial position, and wherein the first compliant lobe is configured to flex upon rotation of the rotatable shaft out of the one or more clocked angular positions.

23. The positioning system of claim 22, further comprising a second compliant lobe radially offset from the first compliant lobe at a second radial position, wherein the second compliant lobe is configured to flex upon rotation of the rotatable shaft out of the one or more clocked angular positions.

24. The positioning system of claim 23, further comprising a third compliant lobe radially offset from the first and second compliant lobes at a third radial position, wherein the third compliant lobe is configured to flex upon rotation of the rotatable shaft out of the one or more clocked angular positions.

25. The positioning system of claim 24, wherein the first, second, and third compliant lobes are radially offset from each other at equal radial positions.

26. The positioning system of claim 24, wherein one or more of the first, second, or third compliant lobes are radially offset from each other at unequal radial positions.

27. The positioning system of claim 3, further comprising a fourth compliant lobe radially offset from the first, second, and third compliant lobes at a fourth radial position, wherein the fourth compliant lobe is configured to flex upon rotation of the rotatable shaft out of the one or more clocked angular positions.

28. The positioning system of claim 12, wherein the positioning spring is formed by an elongate bendable member.

29. The positioning system of claim 28, wherein the elongate bendable member is continuous.

30. The positioning system of claim 29, wherein the elongate bendable member is non-continuous, and comprises first and second ends disconnected from one another, and defining a gap there between.

31. The positioning system of claim 12, wherein the positioning spring further comprises:
a tubular outer housing;
a first flexure retained by an inner surface of the tubular outer housing, the first flexure defining a first compliant lobe.

32. The positioning system of claim 31, wherein the positioning spring further comprises:
a second flexure retained by the inner surface of the tubular outer housing;
wherein the second flexure defines a second compliant lobe radially offset from the first compliant lobe at a second radial position, and wherein the second compliant lobe is configured to flex upon engagement of the second compliant lobe with the rotatable shaft at a surface position out of contact with the detent surface.

33. A method of configuring a positioning spring configured to rotatably engage with a rotatable shaft operable to rotate relative to the positioning spring, the method comprising:
configuring the positioning spring to comprise:
a first axially distal surface defining a perimeter of the positioning spring;
one or more compliant lobes positioned at respective radial positions;
a relief gap formed into the one or more compliant lobes, the relief gap extending from the first axially distal surface along an axial axis of the positioning spring;
wherein the one or more compliant lobes are configured to engage with one or more detent surfaces of the rotatable shaft to resist rotation of the rotatable shaft and to bias the rotatable shaft in one or more angular positions, and
wherein the one or more compliant lobes are configured to flex upon rotation of the rotatable shaft out of the one or more clocked angular position.

* * * * *